(12) United States Patent
Nakamura et al.

(10) Patent No.: US 7,118,167 B2
(45) Date of Patent: Oct. 10, 2006

(54) VEHICLE BODY STRUCTURE

(75) Inventors: Tadashi Nakamura, Wako (JP); Yoshiyuki Toba, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 130 days.

(21) Appl. No.: 10/921,714

(22) Filed: Aug. 19, 2004

(65) Prior Publication Data

US 2005/0046239 A1 Mar. 3, 2005

(30) Foreign Application Priority Data

Aug. 26, 2003 (JP) ............................. 2003-302144

(51) Int. Cl.
*B60J 27/00* (2006.01)
(52) U.S. Cl. ................. 296/193.07; 296/204; 296/209; 296/65.03
(58) Field of Classification Search .......... 296/193.07, 296/203.01, 204, 205, 209, 193.05, 203.03, 296/65.03, 63
See application file for complete search history.

(56) References Cited

U.S. PATENT DOCUMENTS

| 4,402,545 | A | * | 9/1983 | Utsunomiya et al. | ........ 296/204 |
| 4,950,031 | A | * | 8/1990 | Mizunaga et al. | ..... 296/187.11 |
| 5,954,390 | A | * | 9/1999 | Kleinhoffer et al. | ... 296/203.01 |
| 6,375,247 | B1 | * | 4/2002 | Volz et al. | .................... 296/66 |
| 6,793,276 | B1 | * | 9/2004 | Sugihara et al. | ............. 296/204 |
| 2002/0027368 | A1 | * | 3/2002 | Volz et al. | .................... 296/66 |
| 2004/0174046 | A1 | * | 9/2004 | Kamura et al. | ........ 296/193.07 |

* cited by examiner

*Primary Examiner*—Lori L. Coletta
(74) *Attorney, Agent, or Firm*—Rankin, Hill, Porter & Clark LLP

(57) ABSTRACT

A vehicle body structure having right and left floor frame members and right and left side sills located outside the right and left floor frame members is disclosed. Rear end portions of the right and left floor frame members are joined to longitudinally middle portions of the right and left side sills, respectively. Seat brackets for mounting passenger seats are provided on the rear end portions of the right and left floor frame members, respectively, without being extended between the right and left side sills.

19 Claims, 9 Drawing Sheets

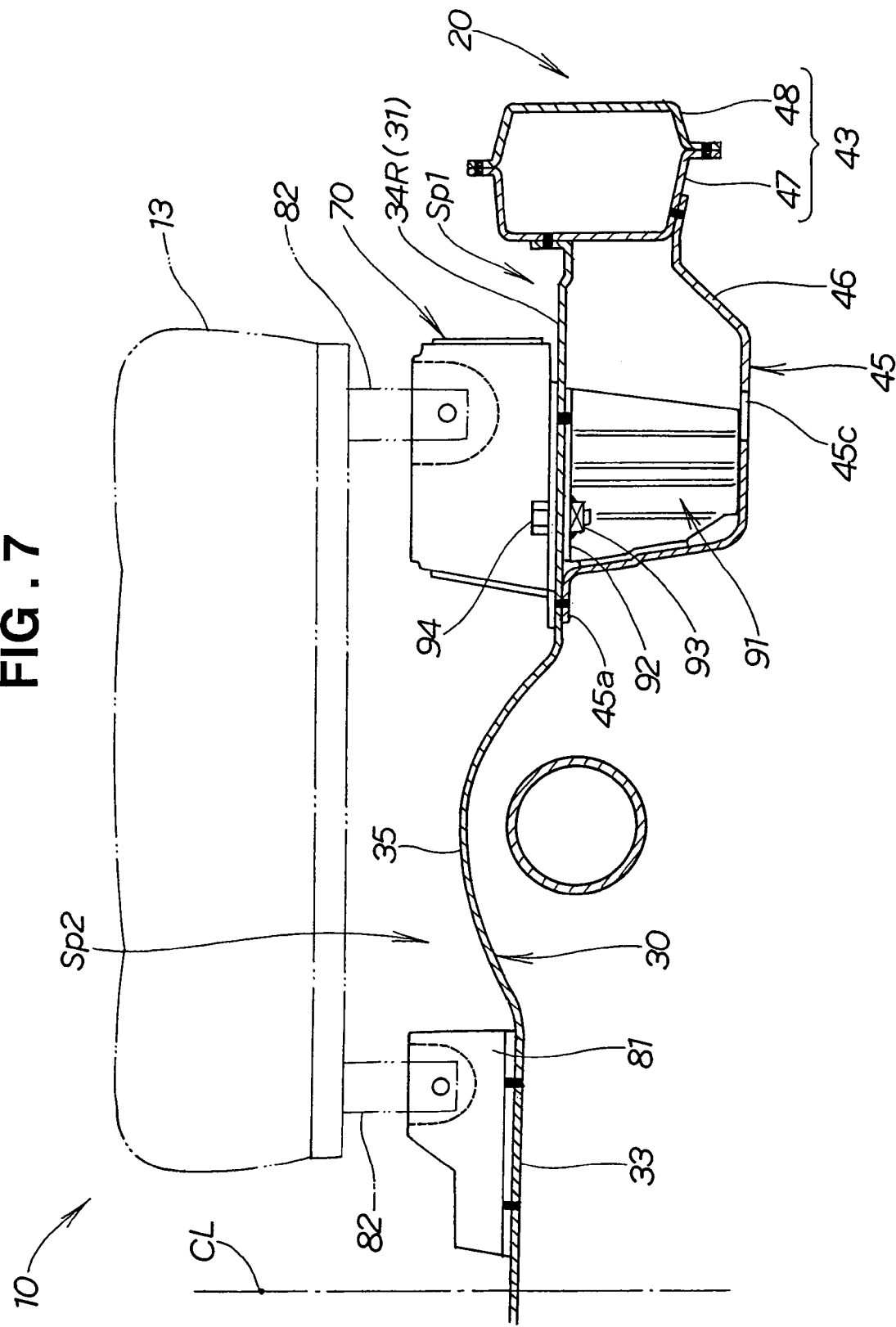

(EMBODIMENT)

(COMP. EX.)

VEHICLE BODY STRUCTURE

FIELD OF THE INVENTION

This invention relates to vehicle body structures and, more particularly, to an improvement in a vehicle body structural portion at which a bracket for mounting a passenger seat on a vehicle body is provided.

BACKGROUND OF THE INVENTION

Generally, for mounting a passenger seat on a vehicle body, a seat bracket is provided on the vehicle body, and the seat consisting of a seat cushion and a seatback is mounted on the seat bracket via a seat rail.

There are two ways to mount the seat bracket on the vehicle body as shown in FIGS. 9 and 10 hereof.

A first vehicle body 100 shown in FIG. 9 has a floor panel 106 and right and left side sills 103, 103 provided at the opposite sides of the floor panel 106, extending longitudinally. A floor tunnel 101 is formed at the transverse center of the floor panel 106, extending longitudinally and protruding upward. A floor tunnel reinforcing member 102 for reinforcing the floor tunnel 101 is provided on the underside of the floor tunnel 101. Seat brackets 104, 104 are provided on top surfaces of the floor panel 106 between the floor tunnel 101 and the right and left side sills 103, 103, respectively. Right and left passenger seats 105, 105 are mounted on the seat brackets 104, 104, respectively.

A second vehicle body 200 shown in FIG. 10 has a floor panel 206, and right and left side sills 203, 203 provided at the opposite sides of the floor panel 206, extending longitudinally. A floor tunnel 201 is formed at the transverse center of the floor panel 206, extending longitudinally and protruding slightly upward. Auxiliary brackets 202, 202 are provided at the corners where the right and left side sills 203, 203 abut on the floor panel 206. A seat bracket 204 is extended on the floor panel 206 between the right and left side sills 203, 203, straddling the floor tunnel 201. Right and left passenger seats 205, 205 are mounted on the seat bracket 204.

The seat brackets 104, 204 shown in FIGS. 9 and 10 are configured such that the seat brackets 104, 204 are extended between the right and left side sills 103, 103 and between the right and left side sills 203, 203, respectively. The seat brackets 104, 204 must be large members to fit the dimensions between the right and left side sills 103, 103 and between the right and left side sills 203, 203, respectively.

There is thus a demand for reducing the size and weight of a seat bracket for mounting a passenger seat on a vehicle body.

SUMMARY OF THE INVENTION

According to the present invention, there is provided a vehicle body structure, which comprises: right and left floor frame members provided on opposite sides of a transversal center of a vehicle body and extending longitudinally of the vehicle body, said floor frame members having rear end portions; right and left side sills provided outside the right and left floor frame members and extending longitudinally of the vehicle body, the side sills having longitudinally middle portions with which the rear end portions of the right and left floor frame members are directly or indirectly joined; and a seat bracket for mounting a passenger seat provided on at least one of the right and left rear end portions.

In this invention, the rear end portions of the right and left floor frame members are joined to the longitudinally middle portions of the right and left side sills, while the seat bracket is provided on at least one of the rear end portions, which eliminates the need for extending the seat bracket between the right and left side sills. Thus, the seat bracket can be reduced to a size attachable to the passenger seat. The seat bracket can thus be reduced in size and weight, resulting in reduced costs of the vehicle body.

The seat bracket can be disposed at a position apart from the side sill, forming a space between the side sill and the seat bracket, which space can be effectively utilized. For example, it can be utilized as a storage space.

Since the seat bracket is set apart from the side sill, when an impact energy acts on the vehicle body from the side, the impact energy is not directly transmitted from the side sill to the seat bracket. The seat bracket and the passenger seat mounted on the seat bracket can thus be prevented from being affected by the impact energy as much as possible.

Preferably, the vehicle body structure further comprises a floor panel, and the floor panel and the seat bracket are placed on the floor frame member in this order, with the floor frame member, the floor panel and the seat bracket in this state being joined together by welding as well as by fastening with fastening members of bolts or rivets.

As described above, the floor panel and the seat bracket are placed on the floor frame member in this order, and the floor frame member, the floor panel and the seat bracket in this state are joined together, whereby the floor frame member and the seat bracket form a closed cross-section structure. As a result, the floor frame member and the seat bracket are increased in strength.

For the joint structure between the floor frame member, floor panel and seat bracket, the joint structure can be obtained by welding. The joint structure can also be obtained by fastening together these components with fastening members such as bolts or rivets. These can also be used in combination, to complement each other's joint structure. When the floor frame member, floor panel and seat bracket are simply spot-welded, for example, it can be necessary to provide a number of holes in the floor frame member for inserting a welding jig. When the number of the holes is increased, it is necessary to increase or reinforce the frame plate thickness to ensure the strength of the floor frame member, expediently increasing the weight of the vehicle.

By contrast, when the joint structure by fastening them together with the bolts is used, nuts can be previously fixed to the back side of the floor frame member. Using the nuts, the bolts can be fastened from one side to easily join the floor frame member, floor panel and seat bracket together. Thus, the number of the jig insertion holes for the joining operation can be reduced, which eliminates the need for increasing or reinforcing the frame plate thickness to ensure the strength of the floor frame members.

BRIEF DESCRIPTION OF THE DRAWINGS

A preferred embodiment of the present invention will be described in detail below, by way of example only, with reference to the accompanying drawings, in which:

FIG. 7 is a cross-sectional view along line 7—7 in FIG. 3;

DETAILED DESCRIPTION OF THE PREFERRED EMBODIMENT

Figure 1:
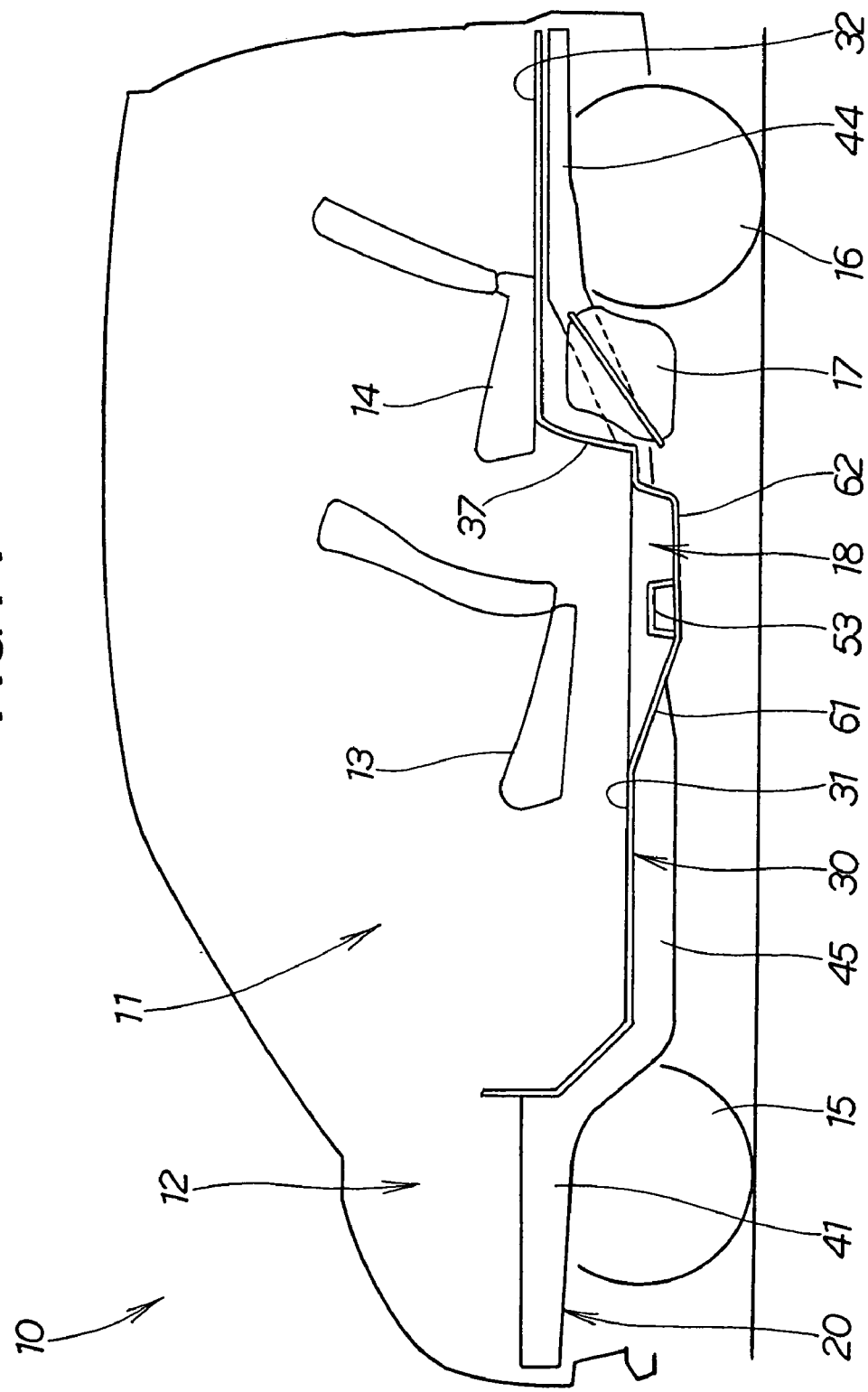
FIG. 1 is a schematic cross-sectional side view of a vehicle having a body structure according to the present invention.

A vehicle 10 shown in FIG. 1 is a station wagon with a tail gate, having a passenger compartment 11 and an engine compartment 12 with no partition between the passenger compartment 11 and a rear trunk. The vehicle 10 has passenger seats (i.e., front seats 13 and rear seats 14) disposed in front and behind in the passenger compartment 11, and has a floor panel 30 extended over frame members of the body 20, a rear portion of which panel 30 forming a trunk portion.

Reference numeral 15 denotes a front wheel, and 16 a rear wheel.

The floor panel 30 includes a front floor panel 31 located at the front of the floor panel 30, and a rear floor panel 32 continued from the rear edge of the front floor panel 31, having a higher horizontal position than that of the front floor panel 31.

The right and left two front seats 13 are disposed at approximately the center of the front floor panel 31. The right and left two rear seats 14 are disposed at the front of the rear floor panel 32. A fuel tank 17 is disposed below the rear floor panel 32, beneath the rear seats 14.

Figure 2:
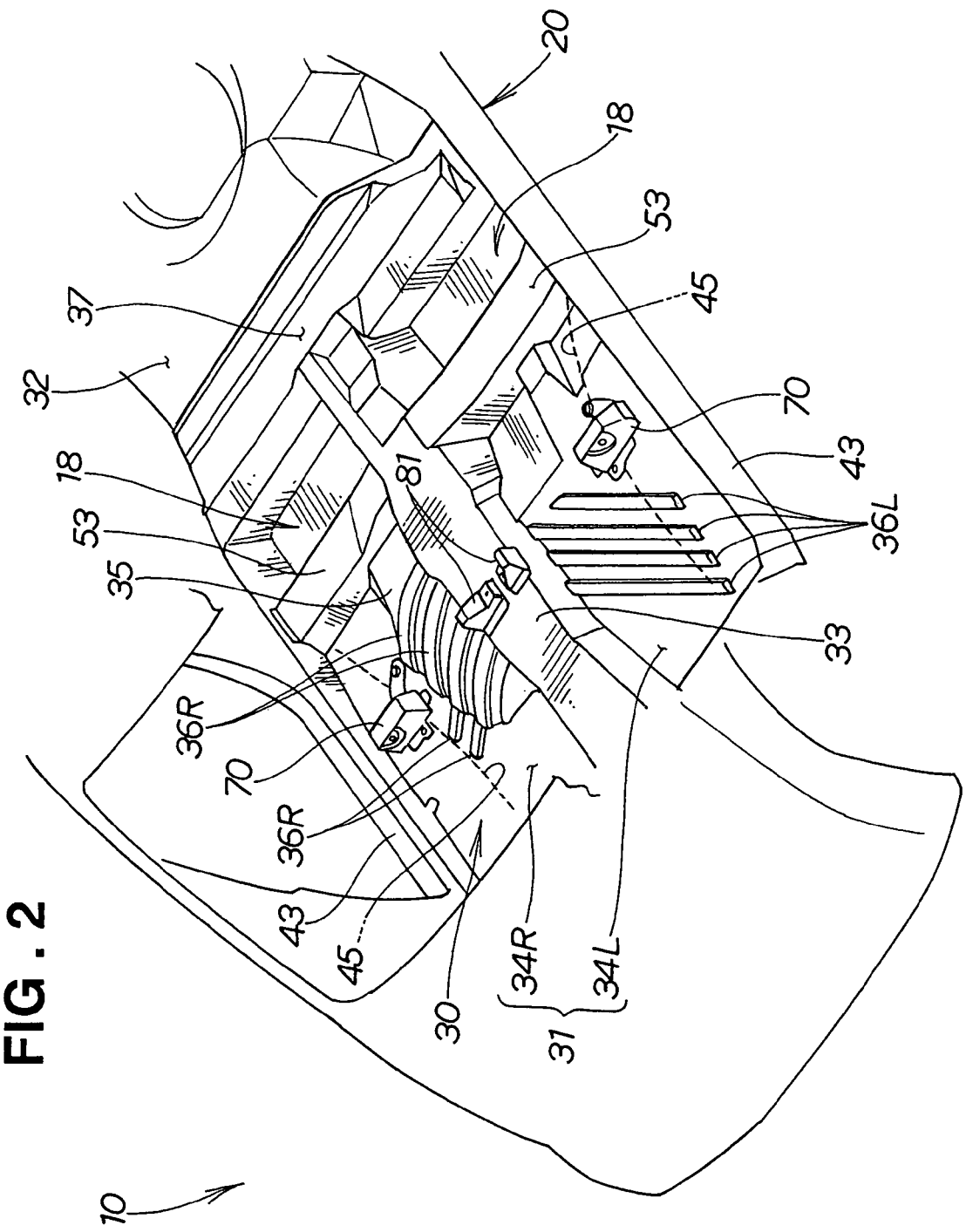
FIG. 2 is a perspective view of the body with a floor panel formed with a plurality of beads according to the present invention.

As shown in FIGS. 1 and 2, the front floor panel 31 has right and left underfloor storage compartments 18, 18 formed between the front seats 13 and the rear seats 14, that is, under the feet of passengers seated on the rear seats 14.

As shown in FIG. 2, the front floor panel 31 has, relative to a floor tunnel 33 located at the transverse center, an almost flat left floor half 34L of the left half, and a right floor half 34R having a bulging portion 35 as a portion of the right half bulging upward. The left floor half 34L and the right floor half 34R each have a number of beads 36L, 36R for increasing the floor rigidity.

Figure 3:
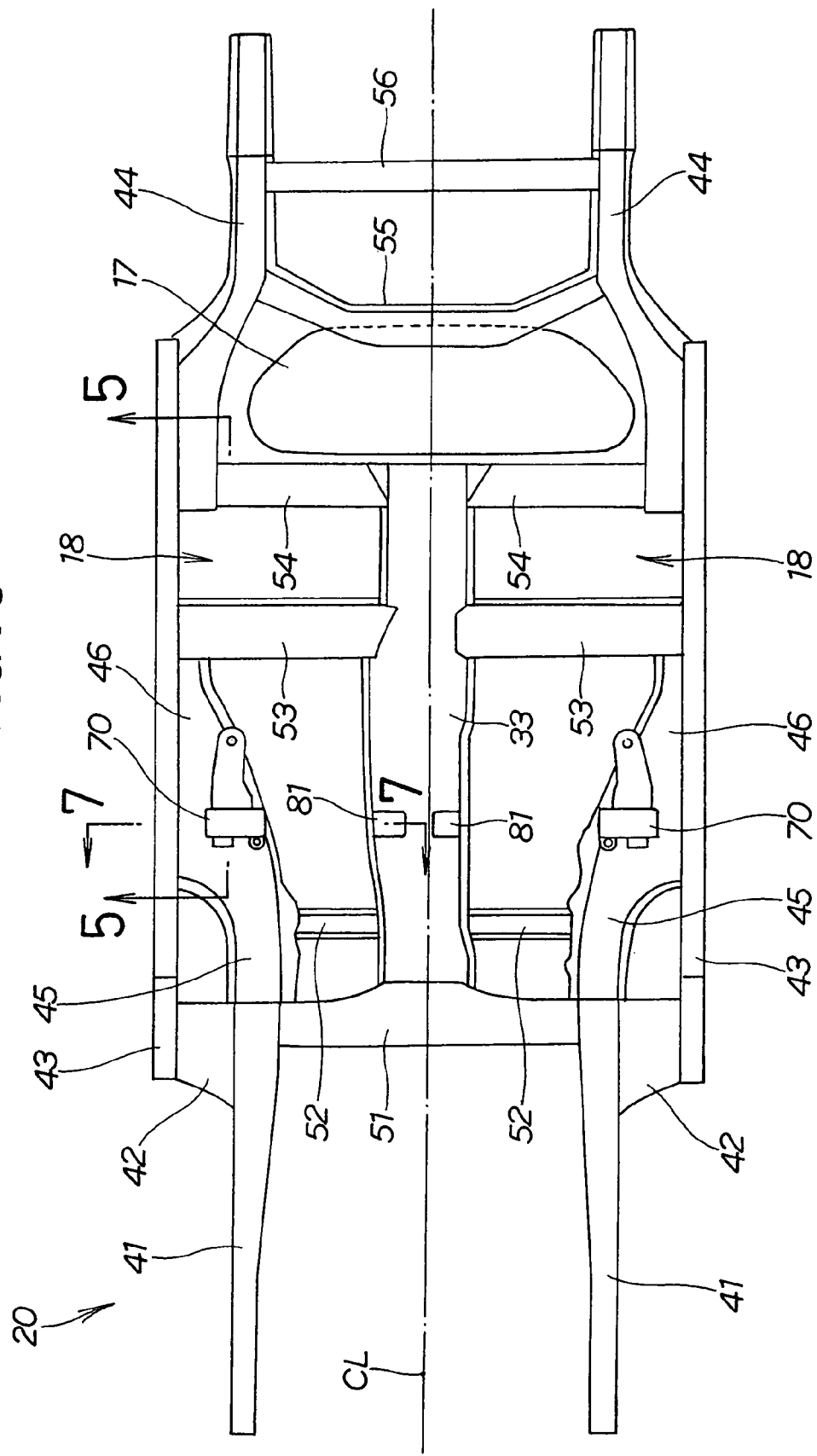
FIG. 3 is a plan view of the body with the floor panel removed.

FIG. 3 is a plan view of the body with the floor panel 30 removed, but, for convenience of explanation, the floor tunnel 33 of the floor panel 30 is exceptionally shown.

The body 20 has, at the front, right and left front side frame members 41, 41 extending longitudinally, right and left side outriggers 42, 42 joined to the rear of the front side frame members 41, 41, right and left side sills 43, 43 extending rearward from the rear of the side outriggers 42, 42, and right and left rear side frame members 44, 44 extending rearward from the rear of the side sills 43, 43, as its main components.

The floor tunnel 33 extends longitudinally at the transverse center (transverse middle) CL. A pair of right and left floor frame members 45, 45 extend longitudinally along the opposite sides of the floor tunnel 33. The floor frame members 45, 45 are joined at their rear end portions 46, 46 to longitudinally middle portions of the right and left side sills 43, 43.

Thus, the floor frame members 45, 45 and the side sills 43, 43 are provided in this order from the transverse center CL side to the right and left sides. As described above, the rear end portions 46, 46 of the right and left floor frame members 45, 45 are directly joined to the longitudinally middle portions of the side sills 43, 43.

In other words, the right and left front side frame members 41, 41 are members extending forward from the front ends of the right and left floor frame members 45, 45.

A first crossmember 51 is extended between the rear ends of the right and left front side frame members 41, 41. A pair of right and left second crossmembers 52, 52 are extended between front portions of the floor tunnel 33 and front portions of the right and left floor frame members 45, 45. Right and left third crossmembers 53, 53 are extended, at the rear end positions of the right and left floor frame members 45, 45, between the floor tunnel 33 and the right and left side sills 43, 43. Right and left fourth crossmembers 54, 54 are extended between the floor tunnel 33 and rear portions of the right and left side sills 43, 43. Fifth and sixth crossmembers 55, 56 are extended between the right and left rear side frame members 44, 44 in front and rear positions.

The floor tunnel 33 extends from the first crossmember 51 to the fourth crossmembers 54.

Now, the relationship between the side sills and the floor frame members will be described with reference to FIGS. 4 to 7.

Figure 4:
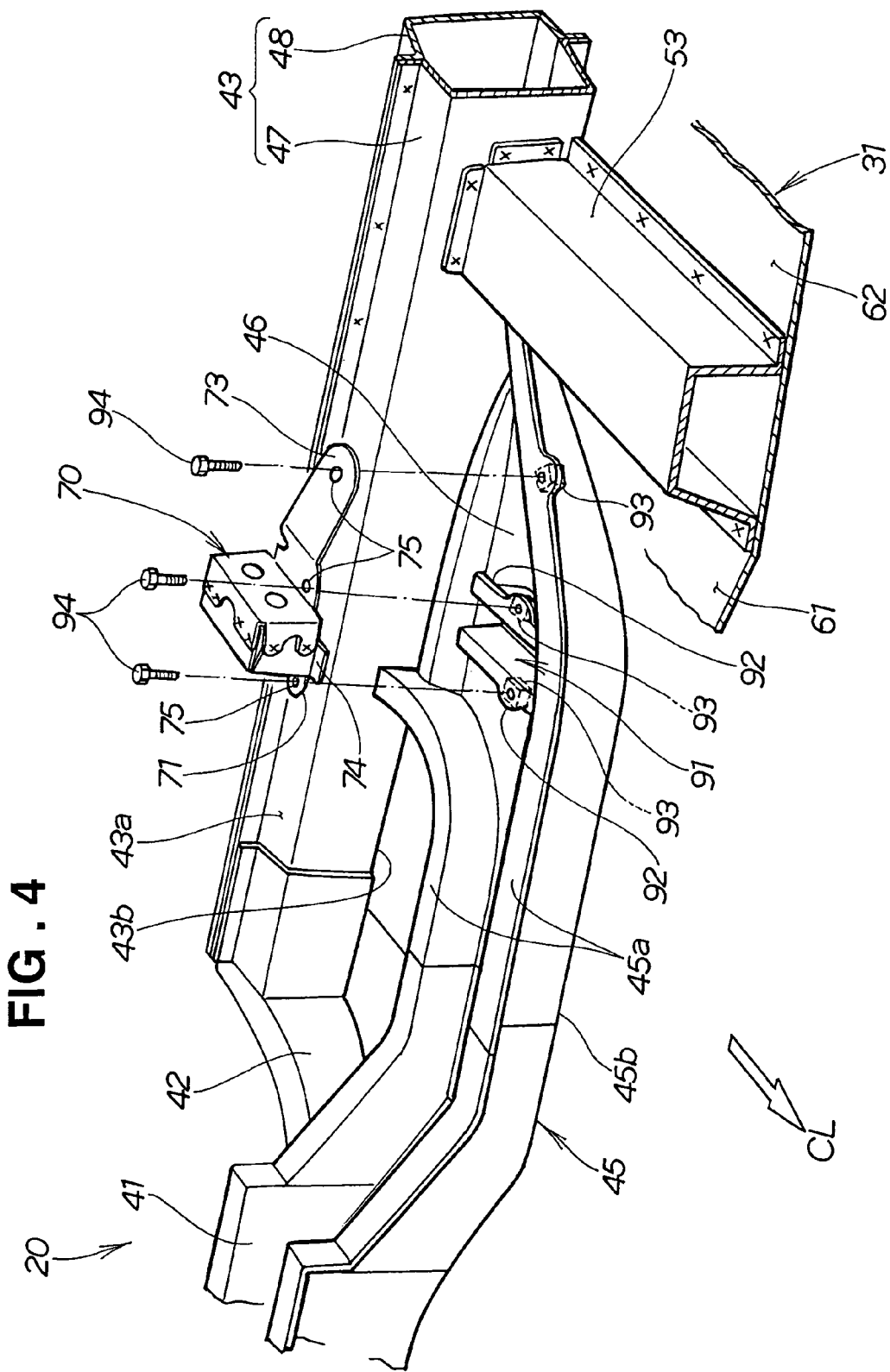
FIG. 4 is a perspective view of the body, illustrating the relationship between a right side sill and a right floor frame member shown in FIG. 3.

As shown in FIG. 4, each side sill 43 is a closed-section beam with a laterally inward side sill inner 47 and a laterally outward side sill outer 48 combined together. When the side sill 43 is viewed from the side, the side sill 43 is a member having a thin front portion joined to the side outrigger 42 and a thick portion rearward of the third crossmember 53.

Figure 5:
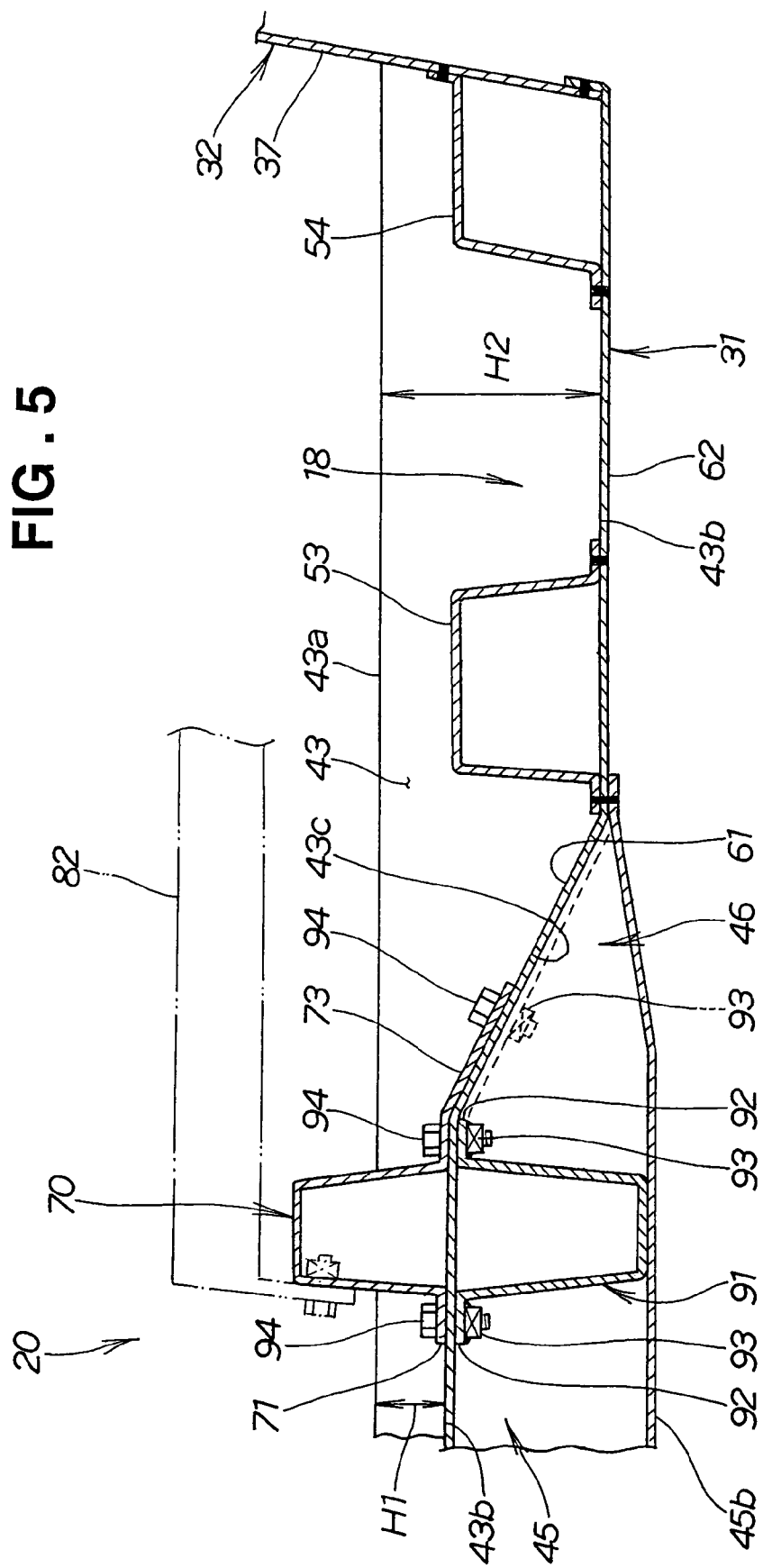
FIG. 5 is a cross-sectional view along line 5—5 in FIG. 3.

More specifically, as shown in FIGS. 4 and 5, the side sill 43 has an almost flat top surface 43a, a thickness at a front portion (the section height from the top surface 43a to a bottom surface 43b) of H1, an inclined surface 43c of a rearward and downward inclination of the bottom surface 43b proximate to the third crossmember 53, and a thickness of H2 at a portion rearward of the third crossmember 53. The rear thickness H2 is greater than the front thickness H1.

Figure 6:
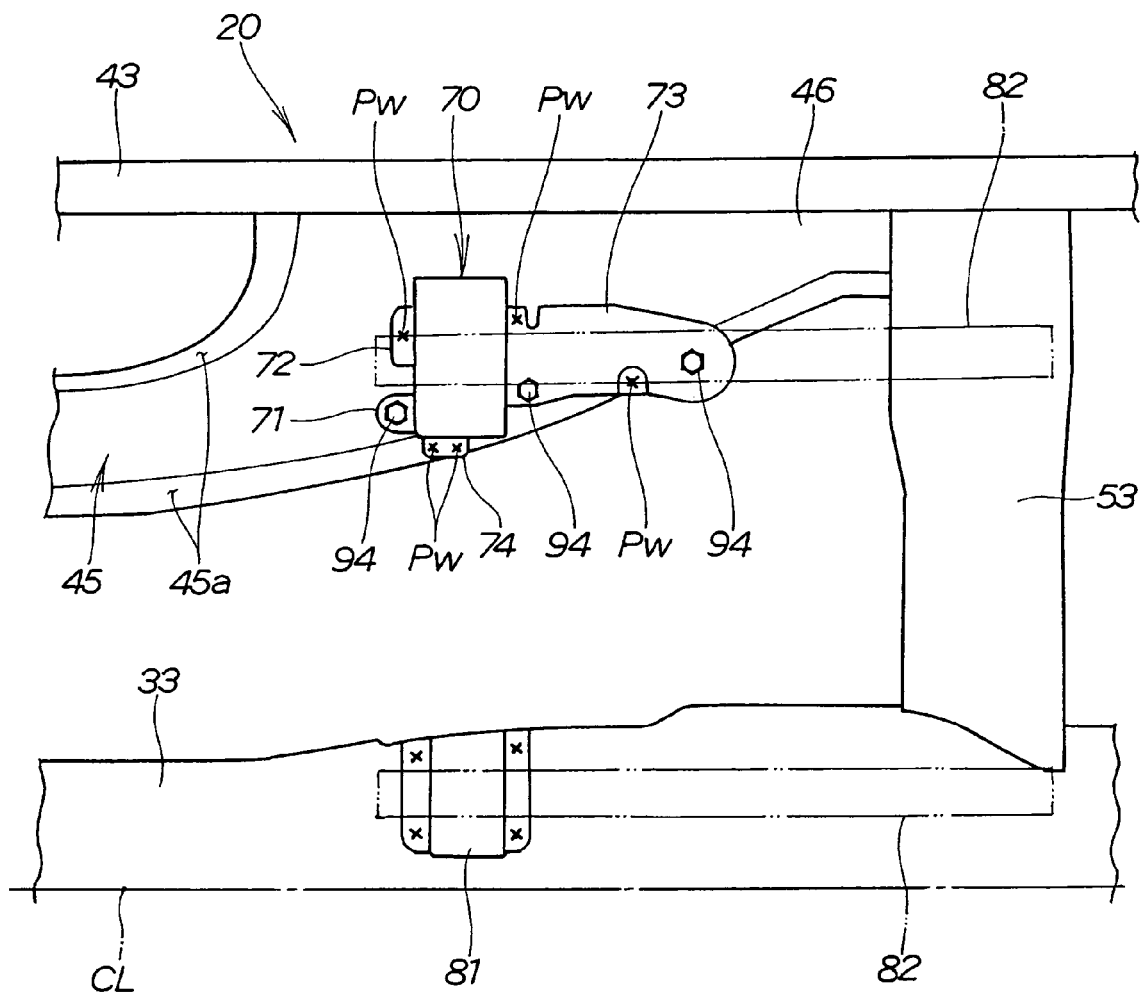
FIG. 6 is a plan view of the body, illustrating the relationship between the right side sill, the right floor frame member and a seat bracket.

As shown in FIGS. 4 and 6, each floor frame member 45 has a substantially U-shaped cross-section opening upward, having flanges 45a, 45a extending from the upper edges to the right and left. The rear end portion 46 of the floor frame member 45 has, when viewed from the top, a widened shape widening in a curve toward the side sill 43.

As shown in FIG. 5, the rear end portion 46 extends rearward along the bottom surface 43b of the side sill 43 and also extends rearward in a taper along the inclined surface 43c of the side sill 43. FIG. 5 illustrates that the end of the rear end portion 46 is joined to the bottom of the third crossmember 53 by spot welding. FIG. 7 illustrates that the end of the rear end portion 46 is joined to the bottom of the side sill 43 by spot welding.

Thus, as shown in FIG. 6, when the body 20 is viewed from the top, the rear end portion 46 of the floor frame member 45 has a widened shape widening in a curve toward the side sill 43, the end of which is joined to a longitudinally middle portion of the side sill 43. The rear end portion 46 is also joined to the third crossmember 53.

That is, as shown in FIG. 3, the right and left floor frame members 45, 45 are set shorter than the right and left side sills 43, 43, and the rear end portions 46, 46 of the right and left floor frame members 45, 45 are directly joined to the longitudinally middle portions of the right and left side sills 43, 43 and also indirectly joined to the longitudinally middle portions of the right and left side sills 43, 43 via the right and left third crossmembers 53, 53.

As a result, the body 20 has sufficient strength and rigidity without extending the floor frame members 45 to the rear of the body 20.

When an impact energy acts from the front on either one of the front side frame members 41, the impact energy is transmitted from the front side frame member 41 to the corresponding floor flame member 45. The impact energy transmitted to the floor flame member 45 can be efficiently dispersed from the rear end portion 46 into the side sill 43 and the third crossmember 53.

As shown in FIG. 5, the front floor panel 31 is a plate material placed and extended, in front of the third crossmembers 53, over the body 20, that is, on the floor frame members 45, and is also placed and extended, behind the third crossmembers 53, over the bottom of the body 20, that is, on the third and fourth crossmembers 53, 54.

The rear floor panel 32 is a plate material having a bent-down portion 37 at its front edge extended downward and joined to the rear of the front floor panel 31.

More specifically, the front floor panel 31 is also extended over the floor frame members 45, and extends rearward and downward in an inclination nearly along the top surfaces inclined rearward downward at the rear end portions 46, and further extends rearward nearly horizontally along the bottom of the third crossmembers 53.

Hereinafter, a portion inclined rearward downward as described above of the front floor panel 31 is referred to as a "front wall 61 of the underfloor storage compartments" and a portion of the front floor panel 31 extending horizontally rearward along the bottom of the third crossmembers 53 is referred to as a "bottom plate 62 of the underfloor storage compartments."

The right and left underfloor storage compartments 18, 18 are, as shown in FIGS. 2, 3 and 5, provided rearward of the rear end portions 46 of the floor frame members 45, extending from the transverse center CL to at least the right and left side sills 43, 43. The underfloor storage compartments 18, 18 are upward-opening depressions in a substantially rectangular shape in a plan view, enclosed by the right and left side sills 43, 43, the central floor tunnel 33, the third crossmembers 53, the front floor panel 31, and the bent-down portion 37 of the rear floor panel 32. The underfloor storage compartments 18, 18 are located on the opposite sides of the floor tunnel 33.

As described above, each underfloor storage compartment 18 has the front wall 61 inclined rearward downward from the front and the nearly horizontal bottom plate 62 extending rearward from the lower edge of the front wall 61. The height of the bottom plate 62 (bottom 62) of the underfloor storage compartment 18, that is, the rear portion of the front floor panel 31 is slightly greater than that of a bottom surface 45b of the floor frame member 45 (see FIG. 5).

The fourth crossmembers 54 may be eliminated. The fourth crossmembers 54 may have a combined structure of the front floor panel 31 and the rear floor panel 32 joined to the rear of the front floor panel 31.

As shown in FIG. 3, an outer seat bracket 70 is provided on at least one of the rear end portions 46, 46 of the right and left floor frame members 45, 45. An inner seat bracket 81 is provided on the floor tunnel 33.

These seat brackets 70, 81 are mounting members for mounting the front seat 13 (passenger seat 13) shown in imaginary lines in FIG. 7. The front seat 13 is longitudinally sidably mounted on the seat brackets 70, 81 via seat rails 82, 82.

Now, the structure of mounting the outer seat bracket 70 on the floor frame member 45 will be described with reference to FIGS. 4 to 7.

The outer seat bracket 70 is a transversely elongated substantially rectangular-shaped box opening downward, integrally having at its lower edges a plurality of joint flanges each extending sideways (two front flanges 71, 72, a rear flange 73, and a laterally inward side flange 74). The front flange 71 located laterally inward has a bolt hole 75. The rear flange 73 has front and rear two bolt holes 75, 75.

As shown in FIG. 5, a stay 91 is provided in the rear end portion 46 of the floor frame member 45 at the position corresponding to that of the seat bracket 70. The stay 91 is a substantially U-shaped member opening upward in a cross-sectional view, having flanges 92, 92 extending forward and rearward from the upper edges. The flanges 92, 92 have flange faces at the same height as that of the flange faces of the flanges 45a, 45a of the floor frame member 45. The flanges 92, 92 of the stay 91 and the flange 45a of the floor frame member 45 have nuts 93 fixed by welding or the like to the back side at positions corresponding to those of the bolt holes 75 of the seat bracket 70.

The seat bracket 70 is placed on the floor frame member 45 and the stay 91 with the front floor panel 31 interposed therebetween. Specifically, the flanges 71 to 74 of the seat bracket 70 are placed on the flange 45a of the floor frame member 45 and the flanges 92, 92 of the stay 91 from above the front floor panel 31, the flanges and the front floor panel 31 are spot-welded together at five weld points Pw (see FIG. 6), and three bolts (i.e., fastening members) 94 are fastened from above into the respective nuts 93 through the bolt boles 75, thereby fastening the seat bracket 70 to the floor frame member 45.

In this manner, the floor panel 30 and the seat bracket 70 are placed on the floor frame member 45 in this order, and the floor frame member 45, floor panel 30 and seat bracket 70 in this state are joined together by spot-welding at the points Pw and also joined together by fastening with the bolts 94.

Thus, as shown in FIG. 5, the floor frame member 45 and the seat bracket 70 form a closed cross-section structure, resulting in increased strength and rigidity of the floor frame member 45 and the seat bracket 70.

For the joint structure between the floor frame member 45, floor panel 30 and seat bracket 70, the joint structure by spot welding and the joint structure by fastening them together with fastening members of the bolts 94 are used in combination, being able to complement each other's joint structure.

When the floor frame member 45, floor panel 30 and seat bracket 70 are simply spot-welded, for example, it can be necessary to provide a number of jig insertion holes 45c (see FIG. 7) in the floor frame member 45 for inserting a welding jig. When the number of the jig insertion holes 45c is increased, it is necessary to increase or reinforce the frame plate thickness to ensure the strength and rigidity of the floor frame member 45, expediently increasing the weight of the vehicle.

By contrast, when the joint structure by fastening with the bolts 94 is used, the nuts 93 can be previously fixed to the back side of the floor frame member 45. Using the fixed nuts 93, the bolts 94 can be fastened from one side to easily join the floor frame member 45, floor panel 30 and seat bracket 70 together. As a result, the number of the jig insertion holes 45c for the joining operation can be reduced. This eliminates the need for increasing or reinforcing the frame plate thickness in order to ensure the strength and rigidity of the floor frame members 45.

As shown in FIG. 7, the rear end portion 46 of the floor frame member 45 is directly and/or indirectly joined to the longitudinal middle portion of the side sill 43, and the outer seat bracket 70 is provided on the rear end portion 46, which eliminates the need for extending the seat bracket 70 between the right and left side sills 43.

Therefore, the seat bracket 70 can be reduced to a size attachable to the passenger seat 13 of the front seat. The seat bracket 70 can thus be reduced in size and weight, resulting in reduced costs of the body 20.

The seat bracket 70 is provided on the rear end portion 46 of the floor frame member 45 joined to the side sill 43, so that the lateral position of the seat bracket 70 can be set freely within the width (within the lateral dimension) of the rear end portion 46 as shown in FIG. 7. Thus, the position of the seat bracket 70 can be easily set to fit the passenger seat 13, increasing the design freedom of the body 20.

Since the seat bracket 70 can be disposed at a position apart from the side sill 43, a space Sp1 is formed between the side sill 43 and the seat bracket 70. The outer seat bracket 70 and the inner seat bracket 81 can be composed of distinct members. Thus, above the floor panel 30, a space Sp2 is formed between the outer and inner seat brackets 70, 81.

These spaces Sp1, Sp2 can be effectively utilized. For example, they can be utilized as storage spaces, or utilized as spaces in which small accessories (a compact disc changer, a navigator unit) are disposed.

Now, the function of the vehicle body structure of the above configuration will be described.

Figure 8A:
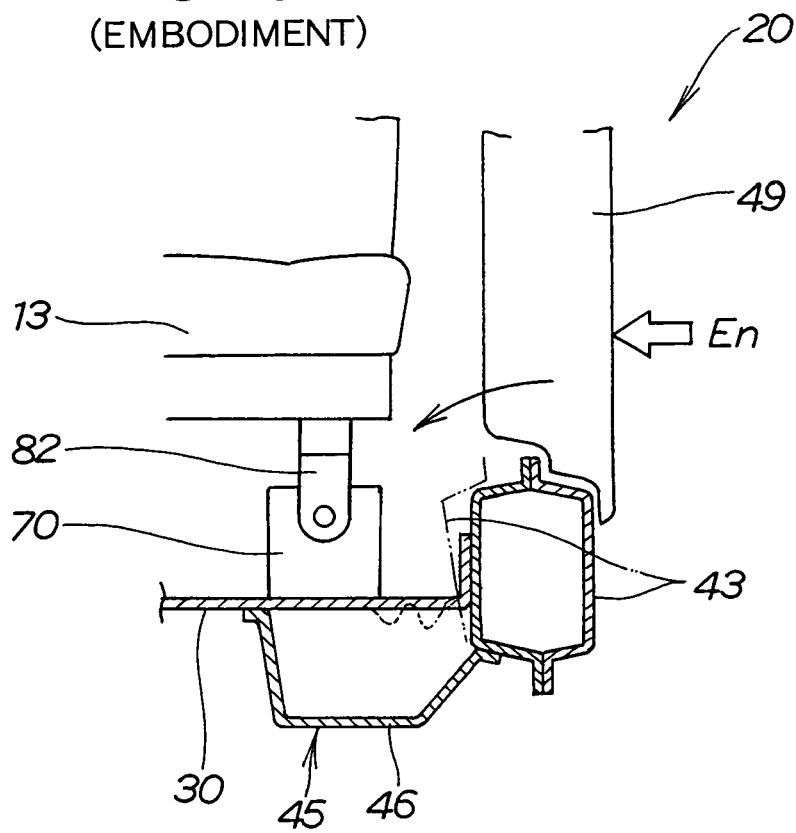
FIGS. 8A and 8B are diagrams illustrating an effect on a seat bracket when an impact energy acts on a side sill in the present embodiment and in a comparative example.
Figure 8B:
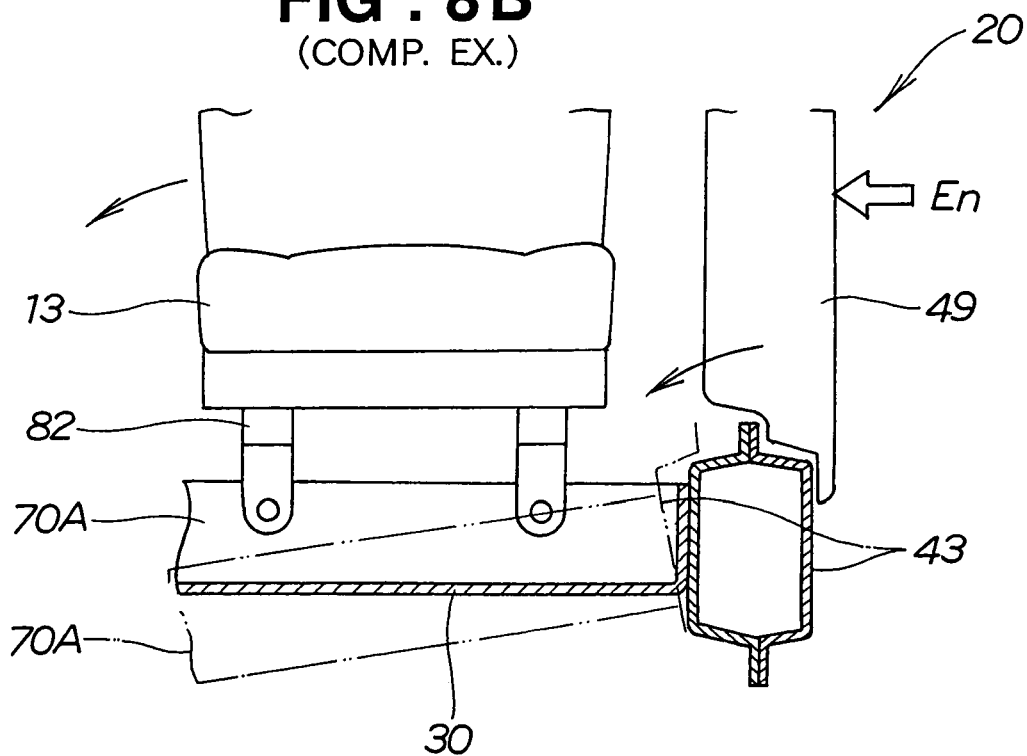
Figure 9:
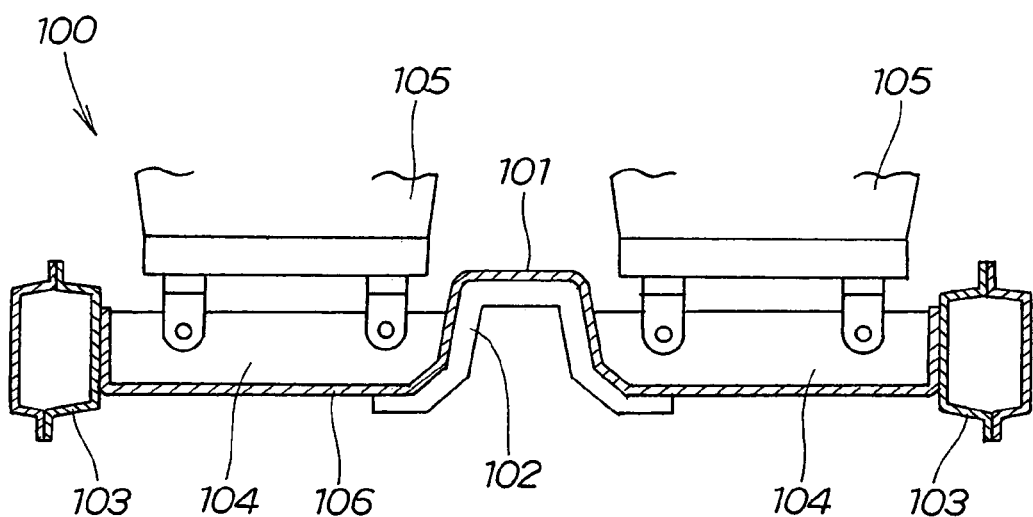
FIG. 9 is a diagram showing a first example in which vehicle seats are mounted via seat brackets in a conventional manner.
Figure 10:
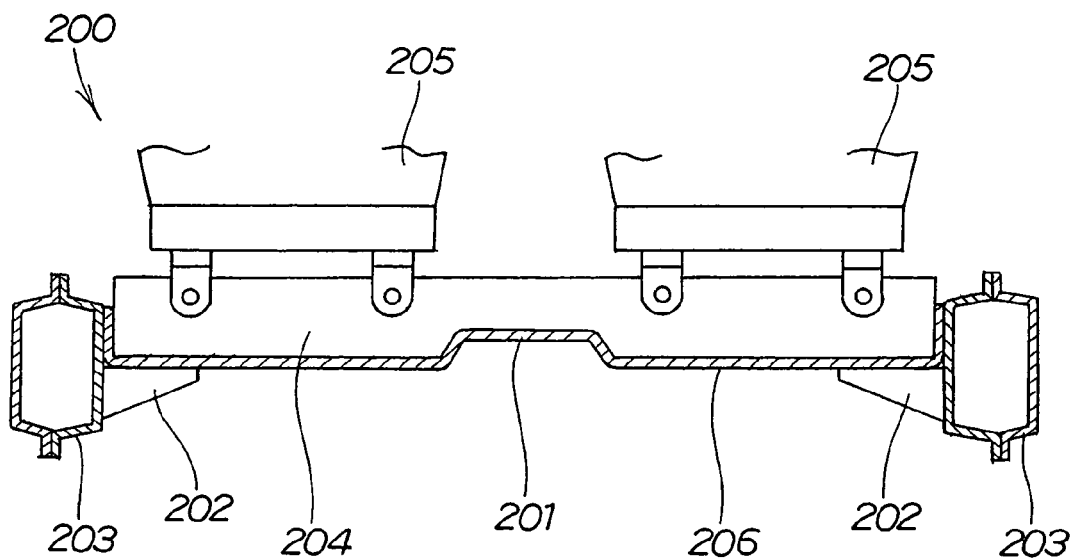
FIG. 10 is a diagram showing a second example in which vehicle seats are mounted via a seat bracket in a conventional manner.

FIGS. 8A and 8B illustrate the vehicle body structure in this embodiment and a vehicle body structure in a comparative example, respectively.

The comparative example shown in FIG. 8B shows an example in which a seat bracket 70A is extended between right and left side sills 43 (only one shown), and a passenger seat 13 is mounted on the seat bracket 70A.

When an impact energy En acts on a vehicle body 20 (e.g., the side sill 43 or a centre pillar 49) from the side, the impact energy En is directly transmitted from the side sill 43 to the seat bracket 70A. Thus, the seat bracket 70A and the passenger seat 13 mounted on the seat bracket 70A are directly affected by the impact energy En.

By contrast, in the embodiment shown in FIG. 8A, the rear end portion 46 of the floor frame member 45 is bent toward and joined to the longitudinally middle portion of the side sill 43, and the seat bracket 70 is provided on the bent rear end portion 46, which eliminates the need for extending the seat bracket 70 between the right and left side sills 43. The seat bracket 70 can thus be set apart from the side sill 43.

When an impact energy En acts on the vehicle body 20 (e.g., the side sill 43 or a centre pillar 49) from the side, the impact energy En is transmitted from the side sill 43 to the seat bracket 70 through the rear end portion 46 of the floor frame member 45. Also, the floor panel 30 is plastically deformed between the side sill 43 and the seat bracket 70. As a result, the impact energy En is not directly transmitted from the side sill 43 to the seat bracket 70. The seat bracket 70 and the passenger seat 13 mounted on the seat bracket 70 can thus be prevented from being affected by the impact energy En as much as possible.

This embodiment shows the example in which the seat brackets 70, 70 are provided on the rear end portions 46, 46 of the right and left floor frame members 45, 45, respectively. The present invention, however, is not limited thereto, and it is alternatively possible to provide a seat bracket 70 on at least one of the rear end portions 46, 46.

The configuration of joining the rear end portions 46 of the floor frame members 45 to the longitudinally middle portions of the side sills 43 may be a direct and/or indirect joint. For example, one of the following configurations (1) to (3) may be used:

(1) the configuration in which the rear end portions 46, 46 of the right and left floor frame members 45, 45 are directly joined only to longitudinally middle portions of the right and left side sills 43, 43;

(2) the configuration in which the rear end portions 46, 46 of the right and left floor frame members 45, 45 are joined only to the third crossmembers 53, 53, and the third crossmembers 53, 53 are joined to longitudinally middle portions of the right and left side sills 43, 43, whereby the rear end portions 46, 46 of the right and left floor frame members 45, 45 are indirectly joined to the longitudinally middle portions of the right and left side sills 43, 43 via the third crossmembers 53, 53. The right and left third crossmembers 53, 53 may alternatively be integrated into one piece; and (3) the configuration using the (1) and (2) in combination.

The joint structure between the floor frame members 45, floor panel 30 and seat brackets 70 may be any as long as it is a combination of a joint structure by welding and a joint structure by fastening with fastening members. The fastening members may be rivets, for example, instead of the bolts 94.

As described above, the body structure in this invention is suitable for vehicles having right and left side sills 43, 43 and right and left floor frame members 45, 45.

Obviously, various minor changes and modifications of the present invention are possible in the light of the above teaching. It is therefore to be understood that within the scope of the appended claims the invention may be practiced otherwise than as specifically described.

What is claimed is:

1. A vehicle body structure comprising:
   right and left floor frame members provided on opposite sides of a transversal center of a vehicle body and extending longitudinally of the vehicle body, said floor frame members having rear end portions;
   right and left side sills provided outside the right and left floor frame members and extending longitudinally of the vehicle body, the side sills having longitudinally middle portions with which the rear end portions of the right and left floor frame members are directly joined;
   a seat bracket for mounting a passenger seat provided on at least one of the right and left rear end portions within a width of said at least one rear end portion.

2. The vehicle body structure as set forth in claim 1, further comprising a floor panel, wherein the floor panel and the seat bracket are placed on the floor frame member in this order, and wherein the floor frame member, the floor panel and the seat bracket in this state are joined together by welding as well as by fastening with fastening members of bolts or rivets.

3. The vehicle body structure as set forth in claim 1, further comprising a floor tunnel and left and right cross members, said floor tunnel extending longitudinally along the transversal centerline of the vehicle body, said left and right cross members extending from said floor tunnel to said left and right side sills, respectively, and wherein said rear end portion of said left floor frame member is directly attached to said left cross member and said rear end portion of said right floor frame member is directly attached to said right cross member.

4. The vehicle body structure as set forth in claim 3, further comprising front side frame members joined to front ends of the floor frame members and extending forwardly therefrom and substantially parallel to the side sills.

5. The vehicle body structure as set forth in claim 1, wherein the rear end portions of the right and left floor frame members each have a cross section widened in a transversely outward direction of the vehicle body.

6. A vehicle body structure comprising:
right and left floor frame members provided on opposite sides of a transversal center of a vehicle body and extending longitudinally of the vehicle body, said floor frame members having rear end portions;
right and left side sills provided outside the right and left floor frame members and extending longitudinally of the vehicle body, the side sills having longitudinally middle portions with which the rear end portions of the right and left floor frame members are directly joined;
a first seat bracket for mounting a first passenger seat, said first seat bracket being affixed to the rear end portion of the right floor frame member at a location inboard from the right side sill;
a second seat bracket for mounting a second passenger seat, said second seat bracket being affixed to the rear end portion of the left floor frame member at a location inboard from the left side sill; and,
a floor panel, wherein the floor panel is disposed between the floor frame member and the seat brackets, and wherein the floor panel and the seat brackets are joined together by welding as well as by fastening with mechanical fastening members.

7. The vehicle body structure as set forth in claim 6, further comprising a floor tunnel and left and right cross members, said floor tunnel extending longitudinally along the transversal centerline of the vehicle body, said left and right cross members extending from said floor tunnel to said left and right side sills, respectively, and wherein said rear end portion of said left floor frame member is directly attached to said left cross member and said rear end portion of said right floor frame member is directly attached to said right cross member.

8. The vehicle body structure as set forth in claim 7, further comprising front side frame members joined to front ends of the floor frame members and extending forwardly therefrom and substantially parallel to the side sills.

9. A vehicle body structure comprising:
right and left floor frame members provided on opposite sides of a transversal center of a vehicle body and extending longitudinally of the vehicle body, said floor frame members having rear end portions;
right and left side sills provided outside the right and left floor frame members and extending longitudinally of the vehicle body, the side sills having longitudinally middle portions with which the rear end portions of the right and left floor frame members are joined; and
a first seat bracket for mounting a first passenger seat, said first seat bracket being affixed to the right floor frame member at a location inboard from the right side sill such that said first seat bracket is spaced from said right side sill;
a second seat bracket for mounting a second passenger seat, said second seat bracket being affixed to the left floor frame member at a location inboard from the left side sill such that said second seat bracket is spaced from said left side sill.

10. The vehicle body structure as set forth in claim 9, further comprising a floor panel, wherein the floor panel and the seat bracket are placed on the floor frame member in this order, and wherein the floor frame member, and wherein the floor frame member, floor panel and the seat bracket in this state are joined together by welding as well as by fastening with fastening members of bolts or rivets.

11. The vehicle body structure as set forth in claim 9, wherein said end portions of said left and right floor frame members are directly connected to the middle portion of said left and right side sills, respectively.

12. The vehicle body structure as set forth in claim 11, further comprising a floor tunnel and left and right cross members, said floor tunnel extending longitudinally along the transversal centerline of the vehicle body, said left and right cross members extending from said floor tunnel to said left and right side sills, respectively, and wherein said rear end portion of said left floor frame member is directly attached to said left cross member and said rear end portion of said right floor frame member is directly attached to said right cross member.

13. The vehicle body structure as set forth in claim 12, further comprising front side frame members joined to front ends of the floor frame members and extending forwardly therefrom and substantially parallel to the side sills.

14. A vehicle body structure comprising:
right and left floor frame members provided on opposite sides of a transversal center of a vehicle body and extending longitudinally of the vehicle body, said floor frame members having respective right and left rear end portions;
right and left side sills provided outside the right and left floor frame members and extending longitudinally of the vehicle body, the side sills having longitudinally middle portions with which the rear end portions of the right and left floor frame members are joined;
a seat bracket for mounting a passenger seat, said seat bracket being affixed to one of the right and left rear end portions and spaced from the right and left side sills such that a space is defined between said left and right side sills and said seat bracket; and
a stay provided in at least one of the right and left rear end portions at a position corresponding to a position of the seat bracket, wherein said seat bracket is secured to one of the right and left rear end portions via the stay.

15. The vehicle body structure as set forth in claim 14, further comprising a floor panel, wherein the floor panel and the seat bracket are placed on the floor frame member in this order, and wherein the floor frame member, the floor panel and the seat bracket in this state are joined together by welding as well as by fastening with fastening members of bolts or rivets.

16. The vehicle body structure as set forth in claim 14, wherein said rear end portions of said left and right floor frame members are directly connected to the middle portion of said left and right side sills, respectively.

17. The vehicle body structure as set forth in claim 16, further comprising a floor tunnel and left and right cross members, said floor tunnel extending longitudinally along the transversal centerline of the vehicle body, said left and right cross members extending from said floor tunnel to said left and right side sills, respectively, and wherein said rear end portion of said left floor frame member is directly attached to said left cross member and said rear end portion of said right floor frame member is directly attached to said rear end portion of said right floor frame member.

18. The vehicle body structure as set forth in claim 17, further comprising front side frame members joined to front ends of the floor frame members and extending forwardly therefrom and substantially parallel to the side sills.

19. The vehicle body structure as set forth in claim 14, wherein the rear end portions of the right and left floor frame members each have a cross section widened in a transversely outward direction of the vehicle body and are directly joined to the longitudinally middle portions of the right and left side sills.

* * * * *